(12) United States Patent
Xu

(10) Patent No.: US 10,150,840 B2
(45) Date of Patent: Dec. 11, 2018

(54) CARBON MOLECULAR SIEVE (CMS) HOLLOW FIBER MEMBRANES AND PREPARATION THEREOF FROM PRE-OXIDIZED POLYIMIDES

(71) Applicant: Dow Global Technologies LLC, Midland, MI (US)

(72) Inventor: Liren Xu, Pearland, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 15/512,723

(22) PCT Filed: Sep. 3, 2015

(86) PCT No.: PCT/US2015/048230
§ 371 (c)(1),
(2) Date: Mar. 20, 2017

(87) PCT Pub. No.: WO2016/048612
PCT Pub. Date: Mar. 31, 2016

(65) Prior Publication Data
US 2017/0247512 A1 Aug. 31, 2017

Related U.S. Application Data

(60) Provisional application No. 62/054,427, filed on Sep. 24, 2014.

(51) Int. Cl.
*B01D 53/22* (2006.01)
*C08G 73/10* (2006.01)
*B01D 67/00* (2006.01)
*B01D 69/08* (2006.01)
*B01D 71/02* (2006.01)

(52) U.S. Cl.
CPC ....... *C08G 73/1075* (2013.01); *B01D 53/228* (2013.01); *B01D 67/0067* (2013.01); *B01D 67/0076* (2013.01); *B01D 69/08* (2013.01); *B01D 71/021* (2013.01); *B01D 2323/08* (2013.01)

(58) Field of Classification Search
CPC ............ B01D 67/0076; B01D 67/0067; B01D 53/228; B01D 71/021; B01D 69/08; C08G 73/1075
See application file for complete search history.

(56) References Cited

U.S. PATENT DOCUMENTS

| | | | |
|---|---|---|---|
| 5,234,471 A | 8/1993 | Weinberg | |
| 6,004,374 A * | 12/1999 | Rao | B01D 53/228 55/DIG. 5 |
| 6,454,836 B1 * | 9/2002 | Koelmel | E21B 43/38 95/46 |
| 6,632,849 B1 * | 10/2003 | Yao | B01D 39/2055 264/43 |
| 7,387,749 B2 * | 6/2008 | Gulari | B82Y 30/00 252/378 R |
| 8,911,534 B2 | 12/2014 | Koros et al. | |
| 9,211,504 B2 | 12/2015 | Bhuwania et al. | |
| 2003/0051874 A1 * | 3/2003 | Munson | E21B 43/38 166/265 |
| 2006/0288677 A1 * | 12/2006 | Kaigawa | B01D 53/02 55/522 |
| 2012/0042780 A1 * | 2/2012 | Koros | B01D 53/228 96/4 |
| 2015/0182921 A1 * | 7/2015 | Koros | B01D 67/0067 96/4 |

FOREIGN PATENT DOCUMENTS

| | | |
|---|---|---|
| EP | 0459623 B1 | 6/1994 |
| EP | 1034836 B1 | 10/2007 |
| JP | 05220360 A | 8/1993 |

(Continued)

OTHER PUBLICATIONS

Meha Rungta et al., in "Membrane-based Ethylene/Ethane Separation: The Upper Bound and Beyond", AIChE Journal, Sep. 2013, vol. 59, No. 9, pp. 3475-3489.
Rachana Singh et al., in Carbon molecular sieve membrane performance tuning by dual temperature secondary oxygen doping (DTSOD), Journal of Membrane Science 427 (2013), pp. 472-478.
Mayumi Kiyono et al., "Effect of polymer precursors on carbon molecular sieve structure and separation performance properties", Carbon 48 (2010), pp. 4432-4441.
Mayumi Kiyono et al., "Generalization of effect of oxygen exposure on formation and performance of carbon molecular sieve membranes", Carbon 48 (2010), pp. 4442-4449.
Liren Xu et al., in "Olefins-selective asymmetric carbon molecular sieve hollow fiber membranes for hybrid membrane-distillation processes for olefin/paraffin separations", Journal of Membrane Science 423-424 (2012), pp. 314-323.

(Continued)

*Primary Examiner* — Anthony R Shumate

(57) ABSTRACT

Prepare a carbon molecular sieve membrane from a polyimide (e.g., a 6FDA/BPDA-DAM polyimide) that has a glass transition temperature of at least 400° C. and includes a bridged phenyl compound for separation of hydrogen and ethylene from one another whether present as a pure mixture of hydrogen and ethylene or as components of a cracked gas. Preparation comprises two sequential steps a) and b). In step a), place a membrane fabricated from defect-free fibers of the polyimide in contact with an oxygen-containing atmosphere under conditions of time and temperature sufficient to produce a pre-oxidized and pre-carbonized polymeric membrane that is insoluble in hot (110 C) n-methylpyrolidone and at least substantially free of substructure collapse. In step b) pyrolyze the pre-oxidized and pre-carbonized membrane in the presence of a purge gas under conditions of time and temperature sufficient to yield a carbon molecular sieve membrane that has at least one of a hydrogen permeance and a hydrogen/ethylene selectivity greater than that of a carbon molecular sieve membrane prepared from the same membrane using only pyrolysis as in step b).

8 Claims, No Drawings

(56) References Cited

FOREIGN PATENT DOCUMENTS

| WO | 2011053403 A1 | 5/2011 |
| WO | 2013181407 A2 | 12/2013 |

OTHER PUBLICATIONS

Keisha M. Steel et al., in "An investigation of the effects of pyrolysis parameters on gas separation properties of carbon materials", Carbon 43 (2005), pp. 1843-1856.

Cheryl W. Jones et al., in "Carbon Molecular Sieve Gas Separation Membranes-I. Preparation and Characterization Based on Polyimide Precursors", Carbon, vol. 32, No. 8, pp. 1419-1425, 1994.

Yoshihiro Kusuki et al., in "Gas permeation properties and characterization of asymmetric carbon membranes prepared by pyrolyzing asymmetric polyimide hollow fiber membrane", Journal of Membrane Science 134 (1997). pp. 245-253.

David et al., "Influence of the thermastabilization process and soak time during pyrolysis process on the polyacrylonitrile carbon membranes for O2/N2 Separation", Journal of Membrane Science, 213 (2003) 285-291.

Okamoto et al., "Olefin/Paraffin Separation through Carbonized Membranes Derived from an Asymmetric Polyimide Hollow Fiber Membrane", Ind. Eng. Chem. Res., Jul. 10, 1999, vol. 38, 4424-4432.

Tanihara N. et al., "Gas permeation properties of asymmertric carbon hollow fiber membranes prepared from asymmetric polyimide hollow fiber", Journal of Membrane Science, Elsevier BV, NL, Jul. 22, 1999, vol. 160, No. 2, 179-186.

Kiyono M et al., "Effect of pyrolysis atmosphere on separation performance of carbon molecular sieve membranes", Journal of Membrane Science, Elsevier BV, NL, Sep. 1, 2010, vol. 359, No. 1-2, 2-10.

Cheryl W. Jones et al., "Carbon Composite Membranes: A Solution to Adverse Humidity Effects", Ind. Eng. Chem. Res., 1995, vol. 34, 164-167.

De Q. Vu et al., "High Pressure CO2/CH4 Separation Using Carbon Molecular Sieve Hollow Fiber Membranes" Ind. Eng. Chem. Res., 2002, vol. 41, 367-380.

Wulin Qiu et al., "Gas separation performance of 6FDA-based polyimides with different chemical structures", Elsevier, 2013, vol. 54, 6226-6235.

Xu et al., "Matrimid® derived carbon molecular sieve hollow fiber membranes for ethylene/ethane separation," Journal of Membrane Science 380 (2011) 138-147.

* cited by examiner

CARBON MOLECULAR SIEVE (CMS) HOLLOW FIBER MEMBRANES AND PREPARATION THEREOF FROM PRE-OXIDIZED POLYIMIDES

The present application claims the benefit of U.S. Provisional Application No. 62/054,427, filed on Sep. 24, 2014.

This invention relates generally to carbon molecular sieve (CMS) hollow fiber membranes, their preparation from pre-oxidized polyimides, and their use in separating gases, especially separating hydrogen ($H_2$) from cracked gas.

During pyrolysis, many asymmetric polymer fibers experience some extent of porous substructure collapse which leads, in turn, to an increase in separation layer (CMS) thickness and a consequent decrease of permeance. A commercially available polymer, Matrimid™ (BTDA-DAPI, a condensation product of 3,3',4,4'-benzophenone tetracarboxylic dianhydride (BTDA) and 5(6)-amino-1-(4'-aminophenyl)-1,3,3'-trimethylindane (DAPI), with a glass transition temperature ($T_g$) of 305 degrees centigrade (° C.)) is an example of a polyimide that experiences such porous substructure collapse at a temperature at or above its $T_g$.

One effort to combat substructure collapse during pyrolysis employs pretreatment of polymer precursor fibers. US Patent Application Publication (USPAP) 2013/0152793 teaches vinyl trimethoxysilane treatment (V-treatment) in an effort to stabilize substructures during pyrolysis of polyimide precursors such as Matrimid™5218 and 6FDA/BPDA-DAM.

European Patent Publication (EP) 0 459 623 (Yoshinaga et al.) teaches a process for fabricating asymmetric hollow filamentary carbon membranes from thermostabilized polyimide fibers for hydrogen/methane separation. The aromatic imide polymer is a polymerization and imidization product of an aromatic tetracarboxylic acid component comprising at least one member selected from biphenyl tetracarboxylic acids and dianhydrides, salts and esters thereof, with an aromatic diamine component that is at least one member selected from diaminodialkyldiphenyl sulfones, diaminodiphenylmethane and 4, 4'-diaminodiphenyl ether.

Meha Rungta et al., in "Membrane-based Ethylene/Ethane Separation: The Upper Bound and Beyond", AIChE Journal, September 2013, Vol. 59, No. 9, pages 3475-3489, presents teachings relative to ethylene/ethane separation performance using a variety of polyimide precursors, three of which are 6FDA/BPDA-DAM, 6FDA-DAM and Matrimid™. Matrimid copolymers result from polymerization of two monomers: 3,3',4,4'-benzophenone tetracarboxylic dianhydride (BTDA) and 5(6)-amino-1-(4'-aminophenyl)-1,3,3'-trimethylindane (DAPI). The teachings include oxygen doping (mixture of oxygen and argon during pyrolysis) and "post-oxygen-doping (secondary exposure to oxygen after pyrolysis at a temperature in excess of that used during pyrolysis).

Rachana Singh et al., in "Carbon molecular sieve membrane performance tuning by dual temperature secondary oxygen doping (DTSOD), Journal of Membrane Science 427 (2013), pages 472-478, discloses that the presence of trace amounts of oxygen in pyrolysis atmospheres allows tuning of the separation performance of CMS membranes (6FDA/BPDA-DAM). See also Mayumi Kiyono et al., "Effect of polymer precursors on carbon molecular sieve structure and separation performance properties", Carbon 48 (2010), pages 4432-4441; and Mayumi Kiyono et al., "Generalization of effect of oxygen exposure on formation and performance of carbon molecular sieve membranes", Carbon 48 (2010), pages 4442-4449.

Liren Xu et al., in "Olefins-selective asymmetric carbon molecular sieve hollow fiber membranes for hybrid membrane-distillation processes for olefin/paraffin separations", Journal of Membrane Science 423-424 (2012), pages 314-323, discusses development of asymmetric CMS hollow fiber membranes with a focus on membranes prepared from 6FDA-DAM and 6FDA/BPDA-DAM precursors.

Keisha M. Steel et al., in "An investigation of the effects of pyrolysis parameters on gas separation properties of carbon materials", Carbon 43 (2005), pages 1843-1856, compares 6FDA/BPDA-DAM and Matrimid™ polymer precursors with respect to various pyrolysis parameters.

Cheryl W. Jones et al., in "Carbon Molecular Sieve Gas Separation Membranes-I. Preparation and Characterization Based on Polyimide Precursors", Carbon, Vol. 32, No. 8, pages 1419-1425, 1994, teaches preparation of CMS membranes by pyrolyzing a hollow-fiber polyimide precursor (e.g. 6FDA/BPDA-DAM) and use of such membranes in separating gas pairs such as $H_2/CH_4$.

Formula 1 below shows a chemical structure for 6FDA/BPDA-DAM where X and Y are each 1 so as to provide a 1:1 ratio.

Formula 1

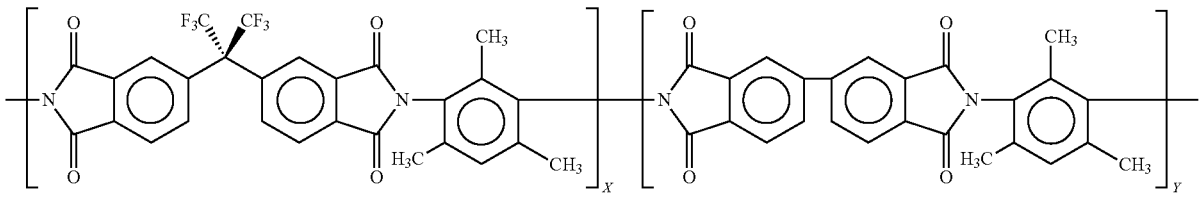

Yoshihiro Kusuki et al., in "Gas permeation properties and characterization of asymmetric carbon membranes prepared by pyrolyzing asymmetric polyimide hollow fiber membrane", Journal of Membrane Science 134 (1997), pages 245-253, discloses carbon membranes prepared by pyrolyzing an asymmetric polyimide hollow fiber membrane at temperatures ranging from 600° C. to 1000° C. under nitrogen for 3.6 minutes.

Notwithstanding improvements obtained in avoiding substructure collapse during pyrolysis, skilled artisans continue to seek further improvements.

One aspect of this invention is a process for preparing a carbon molecular sieve membrane from a polyimide for separation of hydrogen and ethylene from one another comprising sequential steps as follows: a) placing a membrane fabricated from fibers of a polyimide selected from a group consisting of ((5,5'-[2,2,2-trifluoro-1-(trifluoromethyl) ethylidene]bis-1,3-isobenofurandione (6FDA), 3,3',4, 4'-biphenyl tetracarboxylic dianhydride (BPDA), 2,4,6-trimethyl-1,3-phenylene diamine (DAM)) (6FDA/BPDA-DAM) polyimides and polyimides that a) have a glass transition temperature ($T_g$) of at least 400° C. and b) include a bridged phenyl compound (e.g. with a substituted methyl moiety disposed between, and bonded to, two phenyl groups) in contact with an oxygen-containing atmosphere or gas such as pure oxygen or air at a temperature within a range of from greater than 300° C. to less than 400° C. and for a time within that temperature range of greater than or equal to five (5) minutes up to 200 hours (hr) to produce a pre-oxidized and pre-carbonized polymeric membrane that is insoluble in hot (110° C.) n-methylpyrolidone and substantially free, preferably completely free, of substructure collapse; and b) pyrolyzing the pre-oxidized and pre-carbonized polymeric membrane in the presence of a purge gas at a temperature within a range of from 450° C. to 1000° C. and for a time within a range of from 1 minute to 100 hours preferably from two (2) hours to eight (8) hours, to yield a carbon molecular sieve membrane that has at least one of a hydrogen permeance and a hydrogen/ethylene selectivity greater than that of a carbon molecular sieve membrane prepared from the same membrane using only pyrolysis as in step b). The time within the temperature range for step a. is preferably from greater than or equal to 30 minutes to two hours. The purge gas desirably comprises, consists essentially of or consists of argon or another inert gas and, optionally, a trace amount of oxygen, with the trace amount being less than 100 parts by weight per million parts by weight of purge gas (ppm), preferably less than 50 ppm.

Preferred membranes are fabricated from "defect-free" fibers. As used herein, "defect-free" means that a polymeric hollow fiber has a selectivity with respect to a gas pair that is at least 90% of the selectivity for the same gas pair using a dense film made from the same polymer (also known as "intrinsic selectivity").

Polyimides useful in the above process include a monoaromatic diamine moiety rather than a diaromatic amine moiety.

Prepare 6FDA/BPDA-DAM polymers as described by Mayumi Kiyono et al. in the *Journal of Membrane Science* article cited above. See also the Wulin Qiu et al. article in *Polymer* cited above. In brief, prepare such polymers by via thermal or chemical imidization of three monomers: 5,5'-[2,2,2-trifluoro-1-(trifluoromethyl)ethylidene]bis-1,3-isobenofurandione (6FDA), 3,3',4,4'-biphenyl tetracarboxylic dianhydride (BPDA), and 2,4,6-trimethyl-1,3-phenylene diamine (DAM). Such polymers have a glass transition temperature of 424° C. and a decomposition temperature of approximately 450° C. The process is, per Qiu et al., a two-step process. In step one, produce a polyamic acid at a temperature below 5° C. by reacting stochiometric amounts of dianhydride and diamine monomers with agitation in a 20 weight percent NMP solution under a nitrogen purge for 24 hours. In step two, effect chemical imidization by placing the polyamic acid solution in contact with β-picoline and acetic anhydride at ambient temperature (nominally 25° C.) for 24 hours under a nitrogen purge. Precipitate the resulting polyimide out of solution, wash it with methanol and then dry it at 210° C. under vacuum for 24 hours.

Treatment of Matrimid under this regime does not lead to stabilization of substructure. Matrimid has a $T_g$ of approximately 305° C. Treatment in air around 300° C. results in a collapsed structure as shown below.

Treatment of 6FDA/BPDA-DAM polyimide at 300° C. or less or 400° C. or greater does not stabilize substructure. As shown below, treatment at 300° C. or less does not lead to stabilization due to insufficient crosslinking. Treatment at 400° C. or greater leads to a partially collapsed morphology. It is believed that crosslinking achieved by the process reduces the polymer chain mobility, which leads to an observed reduction in the stickiness of the fibers. This stickiness is to be avoided as when the fibers stick together during the pyrolis step, they tend to be prone to becoming more brittle at the sticking points.

The CMS membranes prepared by the above process have utility in effecting separation between gaseous $H_2$ and gaseous ethylene ($C_2H_4$), either in a mixture that contains only $H_2$ and $CH_4$ or in a cracked gas mixture that contains such gases in addition to other gases. Such CMS membranes also have potential utility in olefin/paraffin separation such as ethane/ethylene separation.

The CMS membranes prepared by the above process also show an increase in productivity ($H_2$ permeance) relative to Matrimid and untreated (no pre-oxidation treatment) 6FDA/BPDA-DAM polyimide membranes. The CMS membranes of the present invention have a $H_2$ permeance within a range of from one (1) gas permeation unit (GPU) ($1 \times 10^{-6}$ cubic centimeter (at standard temperature and pressure (273.15 K, 100 kPa))) per centimeter squared-second-centimeter of mercury ($cm^3/cm^2$-s-cm Hg)) to 5000 GPU, preferably from 100 GPU to 1000 GPU.

The CMS membranes prepared by the above process also have an asymmetric morphology as demonstrated by separation layer thickness that is largely unchanged from the asymmetric morphology prior to the pre-oxidation treatment. Pyrolysis conditions suitable for use in preparing CMS membranes via the above process include a temperature within a range of from 450° C. to 1000° C., preferably from 500° C. to 800° C. and more preferably from 550° C. to 700° C., and an inert gaseous purge atmosphere, preferably argon, helium, nitrogen, carbon dioxide or a noble gas other than argon. Pyrolysis conditions also include a time within a range of from one (1) minute to one hundred (100) hours, preferably from one (1) hour to eight (8) hours, and more preferably from 1 hour to two (2) hours.

While a molar 1:1 ratio of 6FDA to BPDA is a preferred ratio, other ratios within a range of from 10:1 to 1:10 provide satisfactory results for $H_2/CH_4$ separation, albeit to a different degree than the 1:1 ratio, as well as some other applications.

EXAMPLE (EX) 1, COMPARATIVE EXAMPLE (CEX) A AND CEX B

Form defect-free Matrimid, 6FDA-DAM, and 6FDA/BPDA-DAM precursor fibers via a dry-jet/wet-quench fiber spinning process. The fiber spinning apparatus and conditions are described by Liren Xu et al., in "Olefins-selective asymmetric carbon molecular sieve hollow fiber membranes for hybrid membrane-distillation processes for olefin/paraffin separations", *Journal of Membrane Science* 423-424 (2012), pages 314-323. In that process, first dry the polymer precursor overnight in a vacuum oven operating at a set point temperature of 110° C. to remove moisture and residual organics. Prepare a spinning dope by forming a visually homogeneous polymer solution (Matrimid™=26.2 wt % polymer, 53 wt % N-methyl-2-pyrrolidone (NMP), 14.9 wt % ethanol (EtOH), and 5.9 wt % tetrahydrofuran (THF); 6FDA-DAM=22 wt % polymer, 43 wt % NMP, 25 wt % EtOH, 10 wt % THF; and 6FDA/BPDA-DAM=25 wt % polymer, 43 wt % NMP, 22 wt % EtOH, 10 wt % THF) by placing a Qorpak® glass bottle sealed with a Teflon® cap on a roller at room temperature. Place the polymer solution in a 500 milliliter (mL) syringe pump and allow it to degas overnight. Coextrude the spinning dope and bore fluid via syringe pumps through a spinneret into an air gap, filtering both through in-line filtration means between delivery pumps and the fiber spinneret, and then into a water quench bath before resulting fibers are taken up using a rotating polyethylene drum after passing over several Teflon™ guides. After collecting the fibers from the take up drum, rinse the fibers in at least four separate water baths over a course of 48 hours, then solvent exchange the fibers in metal tube containers with three separate 20 min methanol baths followed by three separate 20 min hexane baths. Dry the solvent-exchange fibers under vacuum at ~110° C. for ~1 hr.

Treat defect-free precursor Matrimid fibers ($T_g$ of 305° C.) (CEx A), defect-free 6FDA-DAM polyimide fibers (CEx B) ($T_g$ of 395° C.), and defect free 6FDA/BPDA-DAM polyimide fibers (Ex 1) ($T_g$ of 424° C.) in air at temperatures shown in Table 1 below to form preoxidized fibers. Use Scanning Electron Microscopy (SEM) to check preoxidized fiber morphology to determine whether there is evidence of porous layer collapse (yes (Y) or no (N)) and immerse preoxidized fibers in hot (110° C.) n-methylpyrolidone (NMP) to evaluate their solubility (yes (Y) or no (N)). Solubility is an indication of polymer crosslinking, with a decrease in solubility suggesting a corresponding increase in degree of polymer crosslinking and, conversely, an increase in solubility suggesting a corresponding decrease in degree of polymer crosslinking. Show results in Table 1 below.

In evaluating pyrolyzed membranes for pure gas permeation properties, pot the membranes into hollow fiber membrane testing modules. Collect pure gas hydrogen and ethane permeation data by exposing the membrane upstream side to a pressure of 66.7 pounds per square inch absolute (psia) (459,880 pascals) while starting with a downstream side pressure at 16.7 psia (115,142 pascals) in a constant pressure gas permeation system (argon sweep). Measure the flow rate of permeate and sweep gas mixture by a flowmeter and the composition by a gas chromatograph (GC). Use the flow rate and composition to calculate gas permeance and selectivity.

Two properties may be used to evaluate separation performance of a membrane material: its "permeability", a measure of the membrane's intrinsic productivity; and its "selectivity," a measure of the membrane's separation efficiency. One typically determines "permeability" in Barrer (1 Barrer=$10^{-10}$ [cm$^3$ (STP) cm]/[cm$^2$ s cmHg], calculated as the flux ($n_i$) divided by the partial pressure difference between the membrane upstream and downstream ($\Delta p_i$), and multiplied by the thickness of the membrane (l).

$$P_i = \frac{n_i l}{\Delta p_i}$$

Another term, "permeance," is defined herein as productivity of asymmetric hollow fiber membranes. It is typically

TABLE 1

| | Effect of treatment temperature on pre-oxidation | | | | | |
|---|---|---|---|---|---|---|
| | 300° C. for 1 hour | | 350° C. for 1 hour | | 400° C. for 1 hour | |
| Polymer | Solubility | Collapse | Solubility | Collapse | Solubility | Collapse |
| CEx A | N | Y | N | Y | N | Y |
| Ex 1 | Y | N | N | N | N | Y |
| CEx B | Y | N | Partial | Y | N | Y |

The data in Table 1 show that pre-oxidation of 6FDA/BPDA-DAM fibers in air at 350° C. for one hour provides sufficient crosslinking to render such fibers insoluble in hot NMP while avoiding porous layer densification (also known as "porous substructure collapse"). Pre-oxidation in air at 300° C. for one hour does not provide enough crosslinking as evidenced by preoxidized fiber solubility. Pre-oxidation of 6FDA/BPDA-DAM fibers in air at 400° C. for one hour leads to porous substructure collapse. In other words, when pre-oxidizing 6FDA/BPDA-DAM fibers in air for one hour, the temperature at which pre-oxidation occurs must be greater than 300° C. but less than 400° C. By way of contrast, pre-oxidation in air for one hour does not provide both insolubility (sufficient crosslinking) and structure stability (no porous substructure collapse) at any temperature within a range of from 300° C. to 400° C. for either Matrimid fibers (CEx A where substructure collapse occurs at all temperatures) or 6FDA-DAM fibers (CEx B where one gets either insolubility or no substructure collapse, but not both).

Prepare membranes from the preoxidized 6FDA/BPDA-DAM fibers of Ex 1 as well as 6FDA/BPDA-DAM fibers that have no pre-oxidation treatment Subject the membranes to pyrolysis conditions as shown in Table 2 below and evaluate the pyrolyzed membranes for pure gas permeation of hydrogen (($P_{H2}$/l) in GPU) and selectivity (permeance of hydrogen versus ethane (($P_{H2}$/l)/($P_{C2H4}$/l)).

measured in GPU and determined by dividing permeability by effective membrane separation layer thickness.

$$\left(\frac{P_i}{l}\right) = \frac{n_i}{\Delta p_i}$$

Finally, "selectivity" is defined herein as the ability of one gas's permeability through the membrane or permeance relative to the same property of another gas. It is measured as a unitless ratio.

$$\alpha_{i/j} = \frac{P_i}{P_j} = \frac{(P_i/l)}{(P_j/l)}$$

TABLE 2

Transport properties of CMS membranes prepared from 6FDA/BPDA-DAM, and pre-oxidized 6FDA/BPDA-DAM

| Precursor | Pyrolysis T (° C.) | $(P/l)_{H2}$ (GPU) | $\alpha(H2/CH4)$ |
|---|---|---|---|
| Pre-oxidized 6FDA/BPDA-DAM | 550 | 1061 ± 42 | 10.4 ± 2.3 |

TABLE 2-continued

Transport properties of CMS membranes prepared from 6FDA/BPDA-DAM, and pre-oxidized 6FDA/BPDA-DAM

| Precursor | Pyrolysis T (° C.) | $(P/l)_{H2}$ (GPU) | α(H2/CH4) |
|---|---|---|---|
| 6FDA/BPDA-DAM (no pre-oxidation) | 550 | 212 ± 59 | 8.2 ± 1.8 |
| Pre-oxidized 6FDA/BPDA-DAM | 675 | 273 ± 11 | 25.1 ± 2.4 |
| 6FDA/BPDA-DAM (no pre-oxidation) | 675 | 113 ± 16 | 17.4 ± 0.1 |

The data in Table 2 show that preoxidized 6FDA/BPDA-DAM fibers produces CMS fiber membranes with better $H_2/CH_4$ separation performance than membranes fabricated from 6FDA/BPDA-DAM fibers that have no pre-oxidation treatment.

What is claimed is:

1. A process for preparing a carbon molecular sieve membrane from a polyimide for separation of hydrogen and ethylene from one another comprising sequential steps as follows: a) placing a membrane fabricated from hollow fibers of a polyimide that has i) a glass transition temperature ($T_g$) of at least 400° C. and ii) a bridged phenyl compound substituted with a methyl group, wherein said polyimide has been contacted with an oxygen-containing atmosphere or gas at a temperature within a range of from greater than 300° C. to less than 400° C. and for a time within that temperature range of from greater than or equal to five minutes up to 200 hours to produce a pre-oxidized and pre-carbonized polymeric membrane that is insoluble in hot (110° C.) n-methylpyrolidone and substantially free of substructure collapse; and b) pyrolyzing the pre-oxidized and pre-carbonized polymeric membrane in the presence of a purge gas at a temperature within a range of from 450° C. to 1000° C. and for a time within a range of from 1 minute to 100 hours, to yield the carbon molecular sieve membrane.

2. The process of claim 1, wherein the oxygen-containing atmosphere or gas is selected from pure oxygen and air.

3. The process of claim 1, wherein the purge gas comprises argon or another inert gas and, optionally, a trace amount of oxygen.

4. The process of claim 1, wherein time within the temperature range is from greater than or equal to 30 minutes to two hours.

5. The process of claim 1, wherein the temperature for step a) is within a range of from 340° C. to 380° C.

6. The process of claim 1, wherein the time for step b. is within a range of from two hours to eight hours.

7. The process of claim 1, wherein the temperature for step b) is within a range of from 500° C. to 800° C.

8. The process of claim 1, wherein the polyimide is the reaction product of ((5,5'-[2,2,2-trifluoro-1-(trifluoromethyl)ethylidene]bis-1,3-isobenofurandione (6FDA), 3,3',4,4'-biphenyl tetracarboxylic dianhydride (BPDA), 2,4,6-trimethyl-1,3-phenylene diamine (DAM)).

* * * * *